(12) United States Patent
Handa (10) Patent No.: US 8,548,642 B2
(45) Date of Patent: Oct. 1, 2013

(54) CONTROL DEVICE FOR CONTROLLING DRIVE FORCE THAT ACTS ON VEHICLE

(75) Inventor: Toshiyuki Handa, East Liberty, OH (US)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 306 days.

(21) Appl. No.: 13/075,901

(22) Filed: Mar. 30, 2011

(65) Prior Publication Data

US 2012/0253546 A1 Oct. 4, 2012

(51) Int. Cl.
*G06F 17/00* (2006.01)

(52) U.S. Cl.
USPC .................................................. 701/1

(58) Field of Classification Search
None
See application file for complete search history.

(56) References Cited

U.S. PATENT DOCUMENTS

| 5,559,703 | A | * | 9/1996 | Iwata et al. | 701/86 |
| 5,819,194 | A | * | 10/1998 | Hara et al. | 701/89 |
| 6,070,685 | A | * | 6/2000 | Takasaki et al. | 180/250 |
| 2006/0212173 | A1 | | 9/2006 | Post, II | |
| 2008/0015764 | A1 | * | 1/2008 | Watanabe | 701/72 |
| 2008/0183353 | A1 | * | 7/2008 | Post et al. | 701/42 |
| 2009/0043469 | A1 | * | 2/2009 | Fukuda et al. | 701/69 |

* cited by examiner

*Primary Examiner* — Thomas Tarcza
*Assistant Examiner* — Garrett Evans
(74) *Attorney, Agent, or Firm* — Rankin, Hill & Clark LLP (57) ABSTRACT

A control device for controlling a drive force that acts on a vehicle includes a first controller for controlling the drive force, and a second controller for sending to the first control means a limit of the drive force. The second controller has an input unit for inputting the drive force outputted from the first controller, and a calculation unit for calculating a limiting drive force for limiting the drive force. In the case that a first value obtained by subtracting the drive force from the limiting drive force is equal to or greater than a threshold value, the calculation unit outputs a second value that is greater than the limiting drive force.

8 Claims, 6 Drawing Sheets

CONTROL DEVICE FOR CONTROLLING DRIVE FORCE THAT ACTS ON VEHICLE

FIELD OF THE INVENTION

The present invention in essence relates to a control device (drive force-limiting device) for controlling drive force that operates on a vehicle.

BACKGROUND OF THE INVENTION

Vehicles, e.g., automobiles, generally have four wheels; i.e., two front wheels and two rear wheels, and can have an electronic control device for driving the wheels.

Japanese Laid-open Patent Application No. 2006-256605 discloses a four-wheel-drive electronic control unit (4WD-ECU) as such an electronic control device. The 4WD-ECU disclosed in Japanese Laid-open Patent Application (JP-A) No. 2006-256605 together with a vehicle stability assist (VSA)-ECU controls the drive force that acts on the vehicle; and, specifically, sets the four-wheel-drive force in terms of units of, e.g., torque.

A 4WD-ECU thus operates in coordination with the VSA-ECU and controls the drive force. Specifically, the VSA-ECU can request the 4WD-ECU to, e.g., limit the drive force, and can judge whether to respond to the request. Therefore, the VSA-EDU continues to request a limit of the drive force while the 4WD-ECU rejects the request from the VSA-ECU. The present inventor recognized that such a request is unnecessary in the case that such conditions continue. Such a possibility was heretofore unknown to persons skilled in the art.

A VSA-ECU or other vehicle behavior control means can generally be provided with at least one function from among a function for suppressing spinning of the wheels (traction control system), a function for suppressing locking of the wheels (antilock brake system), and a function for suppressing lateral sliding of a vehicle.

SUMMARY OF THE INVENTION

An object of the present invention is to provide a control device that can reduce unnecessary calculation.

Other objects of the present invention will be apparent to those skilled in the art in the description of a plurality of modes and preferred embodiments below with reference to that attached diagrams.

A number of aspects from among the plurality of aspects pursuant to the present invention will be described below in order to facilitate understanding of the general overview of the present invention.

According to the present invention, there is provided a control device for controlling a drive force that acts on a vehicle, the control device comprising: first control means for controlling the drive force; and second control means for sending to the first control means a limit of the drive force, wherein the second control means has: an input unit for inputting the drive force outputted from the first control means, and a calculation unit for calculating a limiting drive force for limiting the drive force; and in a case that a first value obtained by subtracting the drive force from the limiting drive force is equal to or greater than a threshold value, the calculation unit outputs a second value that is greater than the limiting drive force.

The first control means rejects the request from the second control means in the case that the first value obtained by subtracting the drive force from the limiting drive force is equal to or greater than a threshold value. The calculation unit of the second control means outputs a second value that is greater than the limiting drive force, whereby the output of the calculation unit is brought closer to a value that does not limit the drive force. The calculation unit can stop calculation of the limiting drive force in the case that the output of the calculation unit is a value that does not limit the drive force. Unnecessary calculation can thereby be reduced. It is possible to reduce requests for unnecessary limiting drive force in the case that the calculation unit prepares, e.g., a limiting drive force which is a fixed value.

Preferably, the calculation unit continues to calculate the limiting drive force until a count value, which is counted up when the first value is equal to or greater than the threshold value, reaches a predetermined value; and the calculation unit outputs the second value after the count value has reached the predetermined value.

In the case that the first control means receives a request from the second control means, the first control means might not be capable of immediately receiving the request from the second control means. In other words, the response time of the first control means may be delayed. A predetermined value (or predetermined interval) is provided, whereby the second control means can confirm that the first control means is rejecting the request from the second control means, and can thereafter output a second value.

The second control means may begin to send the limiting drive force to the first control means when the vehicle is traveling in an unstable state.

The first control means receives a request from the second control means, and the first control means can reduce the drive force so that the traveling state of the vehicle becomes more stable.

According to the invention, the second control means may request from the first control means an output of the calculation unit.

The second control means may request output of the calculation unit from the first control means in a case that the first control means does not receive a request from the second control means.

Preferably, the calculation unit calculates the limiting drive force in a first mode, and in a case that the first value is equal to or greater than the threshold value, the calculation unit stops the first mode and obtains the second value.

In the case that the first control means rejects a request from the second control means, unnecessary calculation can be suppressed by stopping calculation in the first mode.

According to the invention, the calculation unit may calculate the limiting drive force in a first mode, and in a case that the first value is equal to or greater than the threshold value, the calculation unit may calculate the second value in a second mode instead of the first mode.

Unnecessary calculation can be suppressed overall by calculating the second value in a simplified second mode in the case that the first control means rejects a request from the second control means.

In one preferred form of the invention, the first control means controls, as the drive force, a drive force of a main drive wheel and a drive force of an auxiliary drive wheel, wherein the drive force of the main drive wheel is one of a drive force of a front wheel or a drive force of a rear wheel, and the drive force of the auxiliary drive wheel is another of the drive force of the front wheel or the drive force of the rear wheel; and the second control means sends a limit of the drive force of the auxiliary drive wheel as a limit of the drive force, and the calculation unit calculates as the limiting drive force an auxiliary-drive-wheel-limiting drive force for limiting the drive force of the auxiliary drive wheel.

Unnecessary calculation can be suppressed in the case that the second control means sends a limit of the drive force of the auxiliary drive wheel to the first control means.

According to the invention, the first control means may be a drive force control means, and the second control means may be a vehicle behavior control means.

Persons skilled in the art can readily understand that each of a plurality of embodiments in accordance with the present invention can be modified without departing from the spirit of the present invention.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The embodiments described below are used for facilitating understanding of the present invention. Therefore, persons skilled in the art should note that that the present invention is not unduly limited by the embodiments described below.

1. Vehicle

Figure 1:
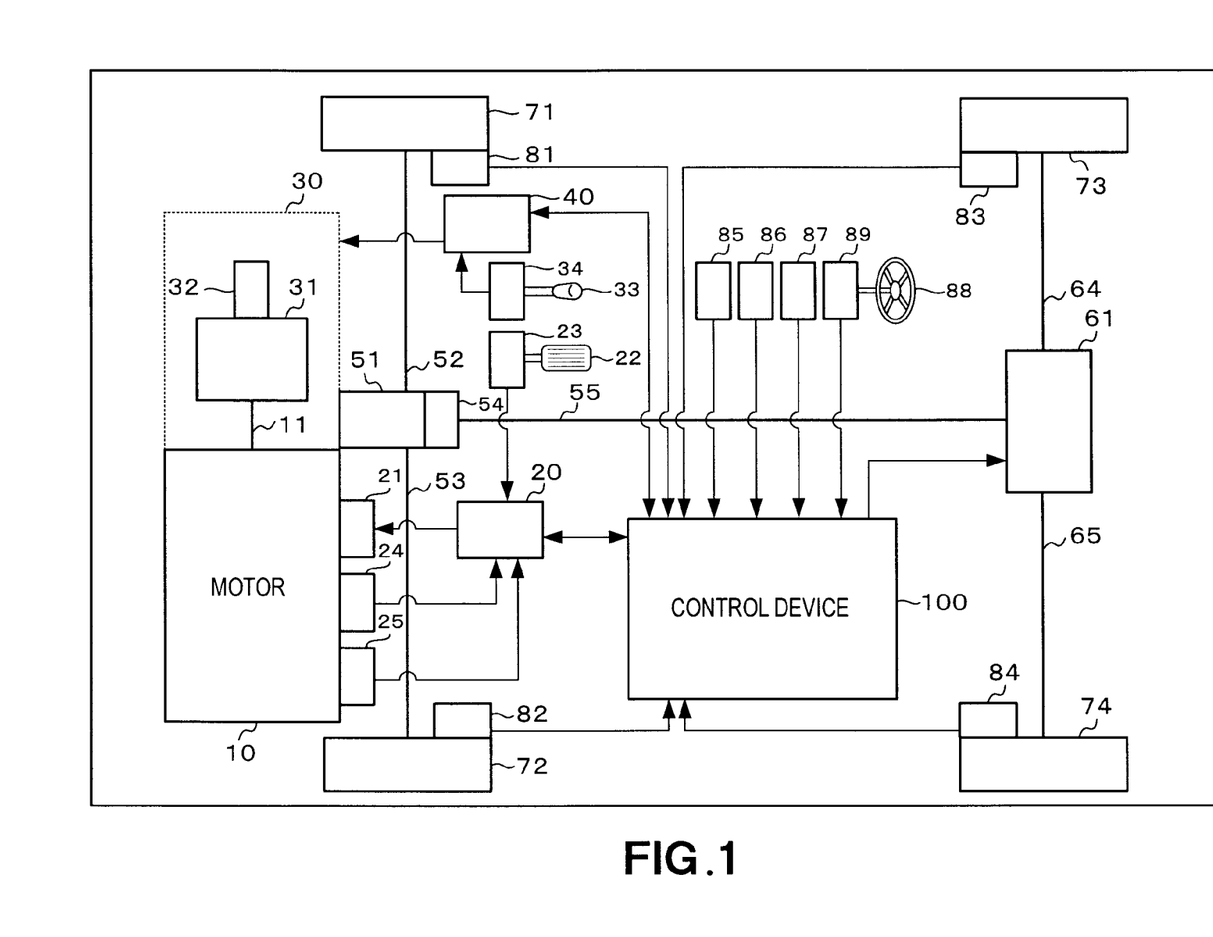
FIG. 1 is a diagrammatical view showing a general configuration of a vehicle provided with a control device according to the present invention.

FIG. 1 diagrammatically shows a general configuration of a vehicle provided with a control device according to the present invention. A vehicle 1 (e.g., an automobile) is provided with a control device 100 capable of executing various controls, as shown in FIG. 1. The control device 100 is capable of controlling the front wheel drive force (the target value of the drive force transmitted to front wheels 71, 72) and the rear wheel drive force (the target value of the drive force transmitted to rear wheels 73, 74) of the vehicle 1 as examples of the various controls. Specific control of the control device 100 according to the present invention is described below in "2. Control Device."

In the example of FIG. 1, the vehicle 1 is provided with a motor 10 (e.g., gasoline engine or another internal combustion engine), the motor 10 has an output shaft 11, and the motor 10 can cause the output shaft 11 to rotate. The vehicle 1 is provided with motor control means 20 (e.g., an engine ECU) for controlling the motor 10, and a throttle actuator 21. The motor control means 20 obtains the motor drive force (target value), and the motor control means 20 controls the throttle actuator 21 so that the rotation (the actual motor drive force) of the output shaft 11 of the motor 10 matches the motor drive force (target value).

The throttle (not shown) position for controlling the amount of air-fuel mixture flowing into the motor 10 is controlled based on the motor drive force via the throttle actuator 21. In other words, the motor control means 20 obtains the throttle position that corresponds to the motor drive force, generates a control signal that corresponds to the throttle position, and sends the control signal to the throttle actuator 21. The throttle actuator 21 adjusts the throttle position in accordance with the control signal from the motor control means 20.

The vehicle 1 is provided with an accelerator pedal 22 and an accelerator sensor 23. The accelerator sensor 23 detects the amount of operation of the accelerator pedal 22 by the driver of the vehicle 1 and sends the amount of operation of the accelerator pedal 22 to the motor control means 20. The motor control means 20 generally obtains the throttle position or the motor drive force on the basis of the amount of operation of the accelerator pedal 22. The vehicle 1 is provided with an engine speed sensor 24 and a pressure sensor 25. In the case that the motor 10 is, e.g., an engine, the engine speed sensor 24 can detect the engine speed, and the pressure sensor 25 can detect the absolute pressure inside the intake tube that takes the air-fuel mixture into the engine. The motor control means 20 can obtain the throttle position or the motor drive force on the basis of the amount of operation of the accelerator pedal 22, and the detected absolute pressure and engine speed. The motor control means 20 can modify the amount of operation of the accelerator pedal 22 on the basis of a control signal (e.g., the traveling state of the vehicle 1) from the control device 100. Alternatively, the motor control means 20 may obtain the motor drive force and the throttle position on the basis of the amount of operation of the accelerator pedal 22, the detected engine speed, the detected absolute pressure, and a control signal from the control device 100.

In the example of FIG. 1, the vehicle 1 may be provided with a power transmission apparatus (power train, drive train). The power transmission apparatus has, e.g., a transmission 30, a front differential gear mechanism 51, front drive shafts 52, 53, a transfer 54, a propeller shaft 55, a rear differential gear mechanism 61, rear drive shafts 64, 65, as shown in FIG. 1. The transmission 30 has a torque converter 31 and gear mechanism 32.

The power transmission apparatus is not limited to the example of FIG. 1, and it is also possible to modify, revise, or implement the example of FIG. 1. The power transmission apparatus may be, e.g., the drive force transmission system 3 disclosed in FIG. 2 of Japanese Laid-open Patent Application (JP-A) No. 07-186758.

The rotation (the actual motor drive force) of the output shaft of the motor 10 is converted to actual all-wheel drive force (the actual front-wheel drive force and the rear-wheel drive force) via the power transmission apparatus. In the control related to such conversion, the all-wheel drive force is determined based on the motor drive force (target value) of the motor control means 20, the amplification factor (target value) of the torque converter 31, and the speed-change gear ratio (target value) of the gear mechanism 32. The distribution from the front-wheel drive force (target value), which is the main drive wheel drive force, to the rear-wheel drive force (target value), which is the auxiliary drive wheel drive force, is determined based on the front-wheel drive force (target value) and the distribution ratio of the rear differential gear mechanism 61.

In the case that the distribution ratio of the rear differential gear mechanism 61 is, e.g., 100:0 in terms of the front-wheel drive force to rear-wheel drive force, the front-wheel drive force (target value), which is the main drive wheel drive force, matches the all-wheel drive force (target value). In the case that the distribution ratio of the rear differential gear mechanism 61 is, e.g., (100−x):x in terms of the front-wheel drive force to rear-wheel drive force, the front-wheel drive force (target value), which is the main drive wheel drive force, matches the value obtained by subtracting the rear-wheel drive force (target value), which is the auxiliary drive wheel drive force, from the all-wheel drive force (target value).

The front wheels 71, 72 are controlled by the front-wheel drive force (target value) via the front differential gear mechanism 51 and the front drive shafts 52, 53. The rear wheels 73, 74 are controlled by the rear-wheel drive force (target value) via the rear differential gear mechanism 61 and the rear drive shafts 64, 65. The actual all-wheel drive force is transmitted to the propeller shaft 55 via the transfer 54, and a portion of the actual all-wheel drive force transmitted to the propeller shaft 55 is distributed to the actual rear-wheel drive force transmitted to the rear differential gear mechanism 61. The remaining portion of the actual all-wheel drive force transmitted to the propeller shaft 55, transfer 54, and front differential gear mechanism 51 is the actual front-wheel drive force.

In the example of FIG. 1, the vehicle 1 is provided with transmission control means 40 (e.g., an automatic transmission (AT) ECU) for controlling the speed-change ratio (e.g., the speed-change gear ratio of the gear mechanism 32) of the transmission 30. The vehicle 1 is provided with a shift lever 33 and a shift position sensor 34, and the transmission control means 40 generally determines the speed-change gear ratio of the gear mechanism 32 on the basis of the shift position (e.g., "1," "2," "D") of the shift lever 33 as detected by the shift position sensor 34.

In the case that the shift position of the shift lever 33 is, e.g., "1," the transmission control means 40 controls the gear mechanism 32 so that the gear mechanism 32 has a speed-change gear ratio that represents the first speed. In the case that the shift position of the shift lever 33 is, e.g., "D," the transmission control means 40 determines the speed-change gear ratio that represents any one among all of the speed-change gears constituting the gear mechanism 32 composed of, e.g., first speed to fifth speed, on the basis of a control signal (e.g., the speed of the vehicle 1 and the all-wheel drive force (target value)) from the control device 100. In accordance therewith, the transmission control means 40 controls the gear mechanism 32 so that the gear mechanism 32 has a speed-change gear ratio that represents any one of, e.g., the first to fifth speeds. For example, when the transmission control means 40 thereafter changes from, e.g., the speed-change gear ratio that represents the first speed to the speed-change gear ratio that represents the second speed, the transmission control means 40 controls the gear mechanism 32 so that the gear mechanism 32 changes from the speed-change gear ratio that represents the first speed to the speed-change gear ratio that represents the second speed.

In the example of FIG. 1, the vehicle 1 is provided with a wheel speed sensor 81 for detecting the rotational speed of the front wheel 71, and is also provided with a wheel speed sensor 82 for detecting the rotational speed of the front wheel 72. The vehicle 1 is provided with a wheel speed sensor 83 for detecting the rotational speed of the rear wheel 73, and is also provided with a wheel speed sensor 84 for detecting the rotational speed of the rear wheel 74. The control device 100 can obtain the speed of the vehicle 1 on the basis of the rotational speed (wheel speed) detected by the wheel speed sensors 81, 82, 83, 84. The vehicle 1 is provided with a longitudinal acceleration sensor 85 (e.g., longitudinal G sensor for detecting acceleration in units of gravitational acceleration) for detecting the acceleration of the vehicle 1 along the front-rear or longitudinal direction of the vehicle 1, and the control device 100 can correct the speed of the vehicle 1 using the acceleration.

In the example of FIG. 1, the vehicle 1 is provided with a yaw rate sensor 86 for detecting the yaw rate when the vehicle 1 turns. The vehicle 1 is also provided with a lateral acceleration sensor 87 (lateral G sensor for detecting the centrifugal acceleration in units of gravitational acceleration) for detecting the centrifugal force (centrifugal acceleration) of the vehicle 1 along the lateral direction of the vehicle 1. The vehicle 1 is provided with a steering wheel 88 and a steering angle sensor 89, and the steering angle sensor 89 detects the steering angle of the steering wheel 88.

The control device 100 can detect side slipping and other behavior of the vehicle 1 on the basis of the yaw rate, centrifugal acceleration (lateral acceleration), and steering angle. In addition to detecting such behavior, the control device 100 can carry out various controls (e.g., control related to at least one among the front wheels 71, 72 and the rear wheels 73, 74 via the brakes or other braking unit (not shown)), and all of the controls described above are not required to be carried out. Described below is a general overview of control of the control device 100.

2. Control Device

Figure 2:
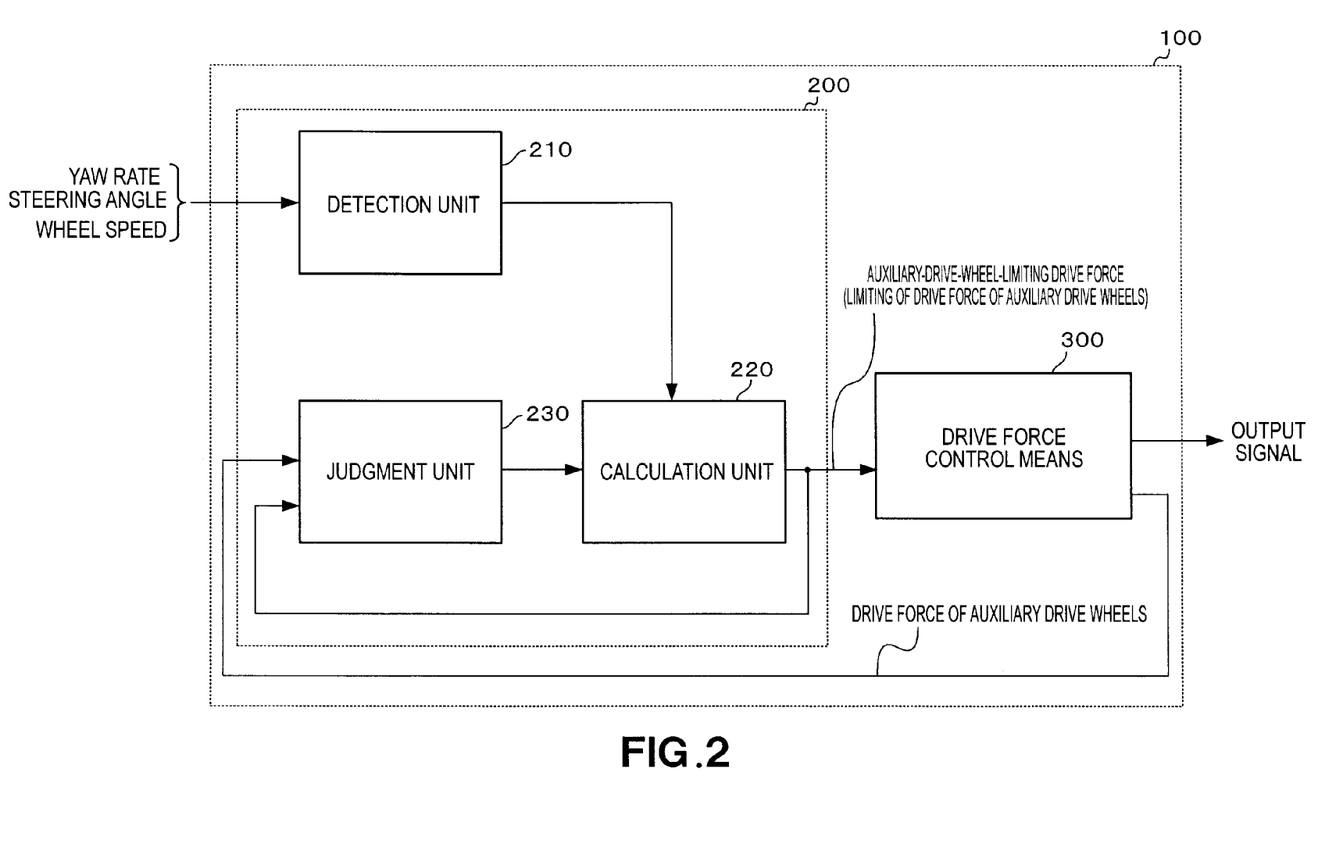
FIG. 2 is a block diagram showing a general configuration of the control device according to the present invention.

FIG. 2 shows in block diagram a general configuration of the control device according to the present invention. The control device 100 can accept, e.g., the yaw rate, the steering angle, and the wheel speed as input signals; generate output signals; and execute various controls, as shown in FIG. 2. The control device 100 is provided with drive force control means 300, and the drive force control means 300 controls the drive force of the main drive wheels (e.g., the front wheel drive force) and the drive force of the auxiliary drive wheels (e.g., rear wheel drive force), as an example of the various controls.

In the example of FIG. 2, the control device 100 is provided with vehicle behavior control means 200. The vehicle behavior control means 200 is capable of calculating the limiting drive force for limiting the drive force as an example of various controls. The vehicle behavior control means 200 is furthermore capable of requesting from the drive force control means 300 the auxiliary-drive-wheels-limiting drive force (limiting drive force) for limiting the drive force of, e.g., the auxiliary drive wheels, and is capable of stopping calculation of the limiting drive force or changing the method for calculating the limiting drive force, as required.

Specifically, the drive force control means 300 determines the ratio between the main drive wheel drive force (target value) and the auxiliary drive wheel drive force (target value), for example, and determines, e.g., the auxiliary drive wheel drive force (target value) on the basis of the ratio and the all-wheel drive force (target value). The drive force control means 300 controls, e.g., the distribution ratio of the rear differential gear mechanism 61 of FIG. 1 using output signals so that the determined auxiliary drive wheel drive force (target value) is obtained. The output signal from the drive force control means 300 to the rear differential gear mechanism 61 is a control signal for controlling the auxiliary drive wheel drive force (target value).

When the auxiliary drive wheel drive force is zero due to the distribution ratio of the rear differential gear mechanism 61, in other words, when the propeller shaft 55 and the rear drive shafts 64, 65 are cut off from each other, the main drive wheel drive force (target value) or the front-wheel drive force matches the all-wheel drive force (target value) in the example of FIG. 1. Alternatively, when the auxiliary drive wheel drive force is not zero due to the distribution ratio of the rear differential gear mechanism 61, in other words, when the propeller shaft 55 and the rear drive shafts 64, 65 are connected, the main drive wheel drive force (target value) matches the value obtained by subtracting the auxiliary drive wheel drive force (target value) from the all-wheel drive force (target value) in the example of FIG. 1.

The vehicle behavior control means 300 is capable of outputting the determined drive force (target value) of the auxiliary drive wheels to the vehicle behavior control means 200. In other words, the input signal from the drive force control means 300 to the vehicle behavior control means 200 is output (drive force (target value) of the auxiliary drive wheels) from the drive force control means 300, for example.

In the example of FIG. 2, the control device 100 is provided with vehicle behavior control means 200. The vehicle behavior control means 200 is capable of accepting external input signals that express, e.g., yaw rate and the like acquired from the yaw rate sensor 86, as shown e.g., in FIG. 1.

In the case that the vehicle behavior control means 200 makes a request for auxiliary-drive-wheels-limiting drive force (limiting drive force) to the drive force control means 300, the drive force control means 300 reduces the auxiliary drive wheel drive force (target value) and the drive force control means 300 increases the main drive wheel drive force (target value). At this time, the drive force control means 300 matches the auxiliary drive wheel drive force (target value) to the auxiliary-drive-wheels-limiting drive force (limiting drive force) to reduce the auxiliary drive wheel drive force (target value). Specifically, the drive force control means 300 controls the rear differential gear mechanism 61 so that the auxiliary drive wheel drive force is reduced by the distribution ratio of the rear differential gear mechanism 61. When the propeller shaft 55 and the rear drive shafts 64, 65 are more weakly connected, the actual auxiliary drive wheel drive force is reduced, and as a result, the actual main drive wheel drive force is increased. Reduced auxiliary drive wheel drive force makes it possible to, e.g., reduce oversteer. Therefore, the stability of the vehicle 1 is improved, for example.

The drive force control means 300 is capable of determining in advance the main drive wheel drive force (target value) and the auxiliary drive wheel drive force (target value), reducing the auxiliary drive wheel drive force (target value) determined in advance in accordance with the a request from the vehicle behavior control means 200, and increasing the main drive wheel drive force (target value) determined in advance.

The drive force control means 300 may also be referred to as first control means for determining the main drive wheel drive force (target value) and the auxiliary drive wheel drive force (target value), and the vehicle behavior control means 200 may be referred to as second control means. The drive force control means 300 (first control means) primarily determines the main drive wheel drive force (target value) and the auxiliary drive wheel drive force (target value). The drive force control means 300 (first control means) may determine whether to respond to the request for limiting the auxiliary drive wheel drive force (target value) from the vehicle behavior control means 200 (second control means), and may reject the request for limitation. In the case that the vehicle behavior control means 200 requests to the drive force control means 300 the auxiliary-drive-wheels-limiting drive force (limiting drive force), the drive force control means 300 (first control means) can secondarily (ultimately) determine the main drive wheel drive force (target value) and the auxiliary drive wheel drive force (target value).

3. Vehicle Behavior Control Means

Second Control Means

FIG. 2 shows a schematic structural diagram of the vehicle behavior control means 200 according to the present invention. The vehicle behavior control means 200 (second control means) is capable of requesting drive force control means 300 (first control means) to limit the drive force of the auxiliary drive wheel (target value). In the example of FIG. 2, the vehicle behavior control means 200 is provided with a detection unit 210, a calculation unit 220, and a judgment unit 230. The vehicle behavior control means 220 is capable of calculating, e.g., the auxiliary-drive-wheels-limiting drive force for limiting the drive force of the auxiliary drive wheels.

3.1. Detection Unit

The detection unit 210 detects, e.g., the unstable state of the vehicle 1 and can instruct the calculation unit 220 so that the calculation unit 220 calculates the auxiliary-drive-wheels-limiting drive force. In the case that an unstable state has been detected, the detection unit 210 can send to the calculation unit 220 a signal (e.g., a signal expressing a binary "1" or high level) expressing instruction or permission to calculate the auxiliary-drive-wheel-limiting drive force. For example, the actual yaw rate obtained from the yaw rate sensor 86 and the reference yaw rate calculated based on the speed of the vehicle 1 and the steering angle are used to determine whether or not the vehicle 1 is traveling in a stable state. Specifically, an unstable state can be defined as when the difference between the actual yaw rate and the reference yaw rate (yaw rate deviation) is greater than a predetermined value. Also, an unstable state may be determined by subjecting the yaw rate deviation to filter processing. It is also possible to correct or adjust the reference yaw rate using the lateral acceleration acquired from the lateral acceleration sensor 87.

The detection unit 210 can accept input of the steering angle from, e.g., the steering angle sensor 89. Also, the detection unit 210 is capable of calculating the average of four rotational speeds (wheel speeds) detected by, e.g., the wheel speed sensors 81, 82, 83, 84 and obtain the average wheel speed Vaw_av of the drive wheels as the speed of the vehicle 1. Alternatively, the detection unit 210 calculates the average of two rotational speeds (wheel speeds) detected by, e.g., wheel speed sensors 83, 84 and can obtain or estimate the speed Vvh_es of the vehicle 1.

The speed Vvh_es (estimated speed) of the vehicle 1 may include the application of an increasing limit and a decreasing limit to each of the wheel speeds of the rear wheels 73, 74 (auxiliary drive wheels) in order to eliminate the effect of noise caused by vibrations and the like of the vehicle 1, for example. In other words, the detection unit 210 is capable of correcting or adjusting the two rotational speeds (wheel speeds) detected by the wheel speed sensors 83, 84, calculating the average of the two rotational speeds (wheel speeds) thus corrected or adjusted, and obtaining or estimating the speed Vvh_es of the vehicle 1. The speed Vvh_es (estimated speed) of the vehicle 1 may be estimated using another method.

The detection unit 210 is capable of sending to the calculation unit 220 a signal that expresses whether the traveling state of the vehicle 1 is unstable, and is furthermore capable of sending to the calculation unit 220 a signal that expresses the difference (yaw rate deviation) between the actual yaw rate and the reference yaw rate of the vehicle 1. In the case that the vehicle 1 is traveling in an unstable state, the calculation unit 220 is capable starting or restarting calculation of the auxiliary-drive-wheel-limiting drive force, and outputting to the drive force control means 300 the calculated auxiliary-drive-wheel-limiting drive force. The calculation unit 220 is capable of calculating the auxiliary-drive-wheel-limiting drive force based on the yaw rate deviation when the auxiliary-drive-wheel-limiting drive force is to be calculated. Specifically, the calculation unit 220 can calculate the auxiliary-drive-wheel-limiting drive force so that the yaw rate deviation is reduced.

3.2. Judgment Unit

The judgment unit 230 of FIG. 2 accepts input of the auxiliary drive wheel drive force from the drive force control means 300 and the auxiliary-drive-wheel-limiting drive force (limit of the auxiliary drive wheel drive force) from the calculation unit 220. The judgment unit 230 is capable of calculating the value (first value) obtained by subtracting the auxiliary drive wheel drive force from the auxiliary-drive-wheel-limiting drive force, and is capable of judging whether the value (first value) is equal to or higher than a threshold value. The auxiliary drive wheel drive force is a value primarily (ultimately) determined by the drive force control means 300, and the calculation unit 220 or the vehicle behavior control means 200 output to the drive force control means 300 a request that the auxiliary drive wheel drive force be matched to the auxiliary-drive-wheel-limiting drive force. Therefore, in the case that there is a difference between the auxiliary drive wheel drive force and the auxiliary-drive-wheel-limiting drive force, the drive force control means 300 rejects the request from the vehicle behavior control means 200. In the case that the value (first value) obtained by subtracting the auxiliary drive wheel drive force and the auxiliary-drive-wheel-limiting drive force is equal to or higher than a threshold value, the judgment unit 230 can send to the calculation unit 220 a signal (e.g., a signal expressing a binary "1" or high level) expressing rejection by the drive force control means 300. The calculation unit 220 can stop calculation of the auxiliary-drive-wheel-limiting drive force or change the method for calculating the auxiliary-drive-wheel-limiting drive force in the case that the calculation unit 220 has received input of a signal expressing rejection by the drive force control means 300. There follows a description of an example in which a judgment is made as to whether the drive force control means 300 has rejected a request from the vehicle behavior control means 200.

3.2.1. Judgment Example

The judgment unit 230 of FIG. 2 may immediately determine whether the drive force control means 300 is rejecting the request from the vehicle behavior control means 200 in the case that the value (first value) obtained by subtracting the auxiliary drive wheel drive force and the auxiliary-drive-wheel-limiting drive force is equal to or higher than a threshold value. However, even in the case that the drive force control means 300 will accept the request from the vehicle behavior control means 200, the drive force control means 300 may not be able to immediately accept the request from the vehicle behavior control means 200. In other words, the response time of the drive force control means 300 may be delayed. Therefore, the judgment unit 200 determines that the drive force control means 300 is not rejecting the request from the vehicle behavior control means 200 until a count value has reached a predetermined value, the count value being counted up when the value (first value) obtained by subtracting the auxiliary drive wheel drive force and the auxiliary-drive-wheel-limiting drive force is equal to or higher than a threshold value. After the count value has reached the predetermined value, the judgment unit 230 judges that the drive force control means 300 is rejecting the request from the vehicle behavior control means 200.

FIGS. 3(A), 3(B), 3(C), and 3(D) are timing charts illustrative of the operation of the judgment of the judgment unit 230. The solid line in the example of FIG. 3(A) represents the auxiliary-drive-wheel-limiting drive force calculated by the calculation unit 220, and the dotted line shows the auxiliary drive wheel drive force determined by the drive force control means 300. The calculation unit 220 or the vehicle behavior control means 200 does not request a limit of the auxiliary drive wheel drive force from the drive force control means 300 until time T1. In other words, up to time T1, the output from the calculation unit 220 is a value (single-dot-dash line) that does not limit the auxiliary drive wheel drive force. The value that does not limit the auxiliary drive wheel drive force is, e.g., a maximum value of the auxiliary drive wheel drive force that can be determined by the drive force control means 300. At time T1, the calculation unit 220 requests from (outputs to) the drive force control means 300 a limit (a value for limiting the auxiliary drive wheel drive force; the auxiliary-drive-wheel-limiting drive force) of the auxiliary drive wheel drive force. In the example of FIG. 3(A), the drive force control means 300 accepts a request from the calculation unit 220 at time T1 and causes the auxiliary drive wheel drive force to match the auxiliary-drive-wheel-limiting drive force. In other words, the drive force control means 300 can cause the primarily determined auxiliary drive wheel drive force to match the auxiliary-drive-wheel-limiting drive force, and can use the auxiliary-drive-wheel-limiting drive force as the secondarily (ultimately) determined auxiliary drive wheel drive force. In the example of FIG. 3(A), the drive force control means 300 accepts a request from the calculation unit 220 from time T1 to time T2 and causes the auxiliary drive wheel drive force to match the auxiliary-drive-wheel-limiting drive force, which is drawn with a solid bold line.

Figure 3:
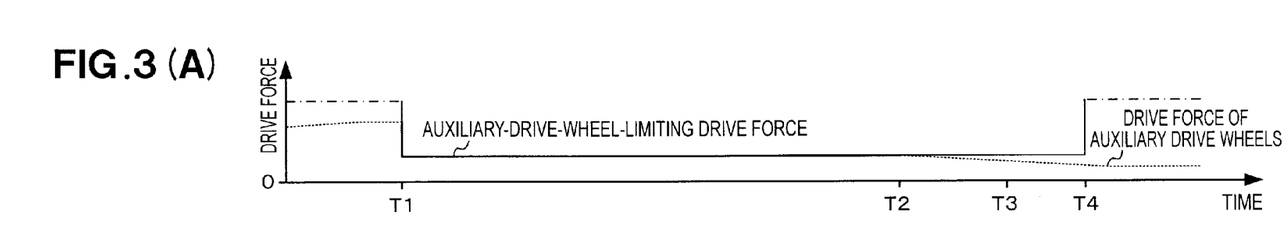
FIGS. 3(A), 3(B), 3(C), and 3(D) are timing charts illustrative of the operation of a judgment unit of the control device.

In the example of FIG. 3 (B), the solid line represents a first value β (i.e., the auxiliary-drive-wheel-limiting drive force–auxiliary drive wheel drive force) calculated by the judgment unit 230, and the dotted line represents a threshold value. The threshold value is, e.g., a value greater than zero. The first value β exceeds the threshold value at time T3. At this time, the judgment unit 230 obtains the count value counted up at a predetermined timing when the first value β is equal to or greater than the threshold value. The judgment unit 230 determines whether the count value has reached an upper limit value UL (predetermined value) at time T3 and thereafter.

The upper limit UL (predetermined value) corresponds to a predetermined interval in the case that the count value increases monotonically from a minimum value MIN (e.g., zero) to the upper limit UL. Therefore, the judgment unit 230 may judge whether the first value β continues to be equal to or greater than the threshold value at time T4, which occurs after a predetermined interval has elapsed from time T3.

The judgment unit 230 sets a reject flag to, e.g., "1" in the case that the count value has reached the upper limit value UL (predetermined value or predetermined interval). The reject flag representing "1" represents that the drive force control means 300 is rejecting the request from the calculation unit 220. The reject flag is set in, e.g., the judgment unit 230, specifically, in a storage unit (e.g., memory, register, or the like (not shown)) in the judgment unit 230.

In the example of FIG. 3(C), the solid line represents the reject flag set by the judgment unit 230. The reject flag represents, e.g., "0" until time T4. The reject flag represents, e.g., "1" at time T4. The reject flag representing "1" may immediately again represent "0."

In the example of FIG. 3(D), the solid line represents the count value (VC) set by, e.g., the judgment unit 230 (storage unit, not shown). The count value represents, e.g., the minimum value MIN (e.g., zero) until time T3. The judgment unit 230 begins counting up or incrementing the count value at time T3. The count value represents, e.g., the upper limit value UL (predetermined value). The count value representing "UL" may be immediately reset to "MIN."

3.2.2. Judgment Method

The judgment unit 230 can use the flag (reject flag) representing whether the drive force control means 300 is rejecting a request from the vehicle behavior control means 200, as shown in FIG. 3(C). The judgment unit 230 can change the flag setting on the basis of the count value (VC), as shown in FIG. 3(D). The judgment method of the judgment unit 230, specifically, the method for setting the flag and VC is described below.

Figure 4:
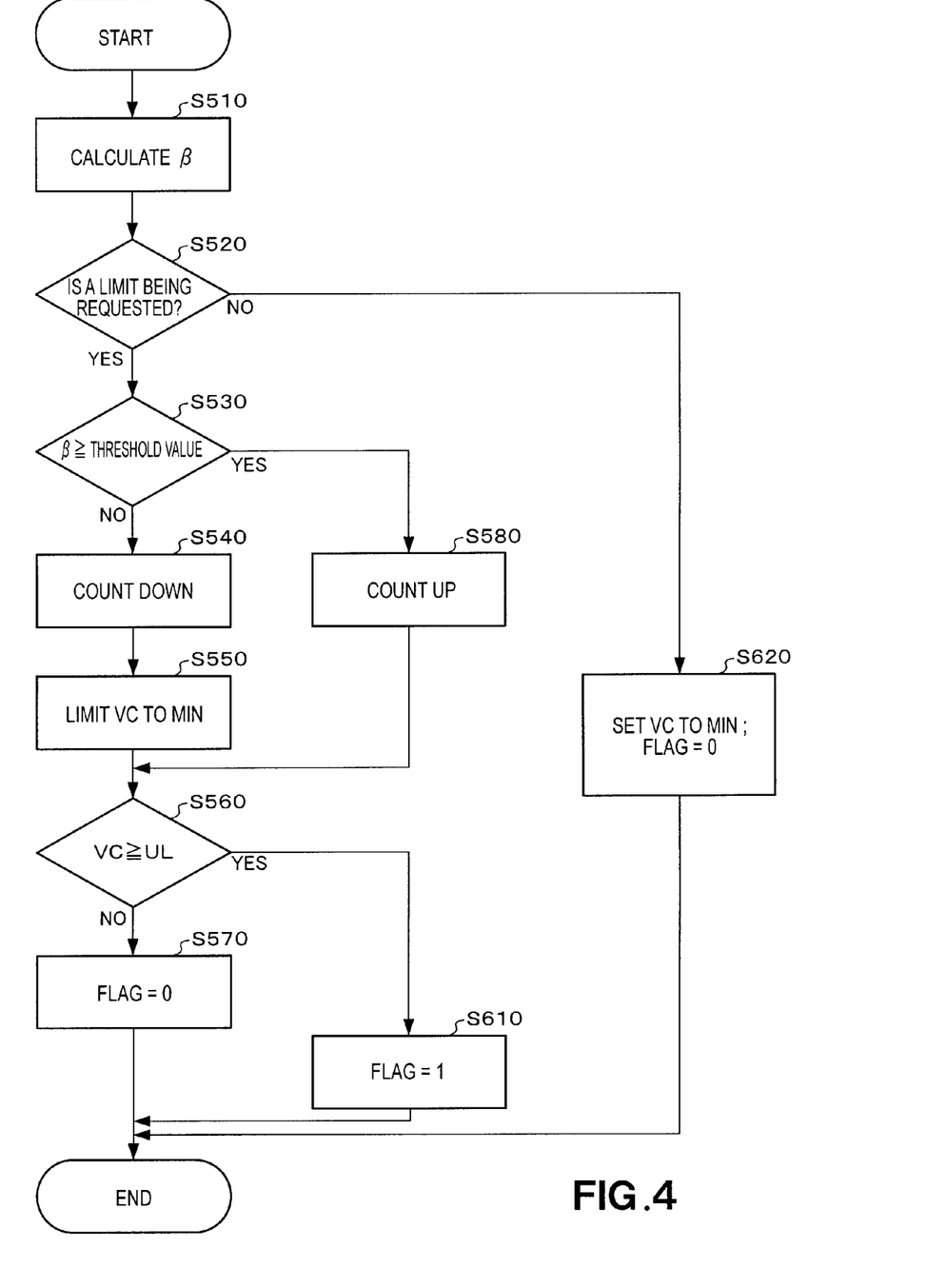
FIG. 4 is a flowchart showing an example of the judgment method or process of the judgment unit.

FIG. 4 represents a judgment method example (flowchart) of the judgment unit 230. The judgment unit 230 repeats a series of processes represented in FIG. 4 with predetermined timing (steps S510 to S620). The judgment unit 230 calculates β (a value obtained by subtracting the auxiliary drive wheel drive force from the auxiliary-drive-wheel-limiting drive force) at, e.g., each predetermined timing (step S510), and the flag (reject flag) and VC (count value) can be set or updated. The initial values of the flag and VC are, e.g., "0."

In the example of FIG. 4, the judgment unit 230 judges (step S520) whether the calculation unit 220 is requesting from the drive force control means 300, e.g., a limit of the auxiliary drive wheel drive force. In the example of, e.g., FIG. 3(A), the judgment unit 230 judges that a limit of the auxiliary drive wheel drive force is not being requested from the drive force control means 300 (step S520; No) until time T1 and at time T4 and thereafter, and the judgment unit 230 judges that that a limit of the auxiliary drive wheel drive force is being requested from the drive force control means 300 from time T1 to time T4 (step S520; Yes). In the example of FIG. 4, the judgment unit 230 judges whether β (the value obtained by subtracting the auxiliary drive wheel drive force from the auxiliary-drive-wheel-limiting drive force) is equal to or higher than the threshold value (step S530) in the case that Yes is judged to be the result in step S520. In the example of, e.g., FIG. 3(B), the judgment unit 230 judges that β is equal to or higher than the threshold value from time T3 to time T4 (step S530; Yes), and the judgment unit 230 judges that β is less than the threshold value (step S530; No) from time T1 to time T3.

In the example of FIG. 4, the judgment unit 230 calculations VC (step S580) in the case that Yes is judged to be the result in step S530. In the example of, e.g., FIG. 3(D), VC increases from MIN to UL from time T3 to time T4, and VC represents UL at time T4. In step S580, the judgment unit 230 may calculation VC so that VC is not set to be higher than UL (maximum value UL). In the example of FIG. 4, the judgment unit 230 counts down (step S540) VC (count value) in the case that No is judged to be the result of step S530. However, VC is not set (step S550) to be less than MIN (minimum value). In the example of, e.g., FIG. 3(D), VC represents MIN (minimum value) from time T1 to time T3. In the example of FIG. 4, the judgment unit 230 judges (S560) whether VC is UL (upper limit value). In the example of FIG. 3(D), the judgment unit 230 judges that VC is less than UL (step S560; No) from time T1 to time T4, and the judgment unit 230 judges that VC is UL or higher (step S560; Yes) at time T4.

In the example of FIG. 4, the judgment unit 230 sets (step S570) the flag to "0" in the case that No is judged to be the result of step S560. In the example of, e.g., FIG. 3(C), the judgment unit 230 sets or updates the flag to "0" from time T1 to time T4.

In the example of FIG. 4, the judgment unit 230 sets (step S610) the flag to "1" in the case that Yes is judged to be the result of step S560. In the example of, e.g., FIG. 3(C), the judgment unit 230 sets or updates the flag to "1" at time T4.

In the example of FIG. 4, the judgment unit 230 sets VC to MIN and the flag to "0" (step S620) in the case that No is judged to be the result of step S520. In the example of, e.g., FIG. 3(D), the judgment unit 230 sets VC to MIN until time T1 and at time T4 and thereafter. In the example of, e.g., FIG. 3(C), the judgment unit 230 sets the flag to "0" until time T1 and at time T4 and thereafter.

3.3. Calculation Unit

The calculation unit 220 of FIG. 2 is capable of calculating the auxiliary-drive-wheel-limiting drive force for limiting, e.g., the auxiliary drive wheel drive force primarily determined by the drive force control means 300 of, e.g., FIG. 2. The calculation unit 220 calculates the auxiliary-drive-wheel-limiting drive force at time T1, as shown in, e.g., FIG. 3(A), and the calculation unit 220 outputs the auxiliary-drive-wheel-limiting drive force from time T1 to time T4. In the example of FIG. 3(A), the auxiliary-drive-wheel-limiting drive force is a fixed value, but the auxiliary-drive-wheel-limiting drive force is not required to be a fixed value. In other words, in the example of the FIG. 3(A), the calculation unit 220 directly prepares or holds the auxiliary-drive-wheel-limiting drive force calculated at time T1 as a fixed value from time T1 to time T4, but the calculation unit 220 may continue to calculate the auxiliary-drive-wheel-limiting drive force from time T1 to time T4.

The calculation unit 220 can accept as input from the detection unit 210 a signal that represents the difference (yaw rate deviation) between the actual yaw rate and the reference yaw rate of the vehicle 1. The calculation unit 220 can calculate the auxiliary-drive-wheel-limiting drive force as a fixed value or as an unfixed value on the basis of, e.g., the yaw rate deviation. The calculation unit 220 may calculate the auxiliary-drive-wheel-limiting drive force so that the yaw rate deviation is smaller.

In the example of FIG. 3(A), the calculation unit 220 outputs a value (single-dot-dash line) that does not limit the auxiliary drive wheel drive force as a second value that is greater than the auxiliary-drive-wheel-limiting drive force after the value (VC) has reached UL (predetermined value), the value (VC) being counted up when the first value β is equal to or higher than the threshold value, and the first value β being obtained by subtracting the auxiliary drive wheel drive force from the auxiliary-drive-wheel-limiting drive force. The value is an initial value obtained by stopping calculation of the auxiliary-drive-wheel-limiting drive force. The calculation unit 220 continues to output the auxiliary-drive-wheel-limiting drive force (solid line) at time T4 and thereafter in the case that the count value (VC) has not reached UL (predetermined value).

Figure 5:
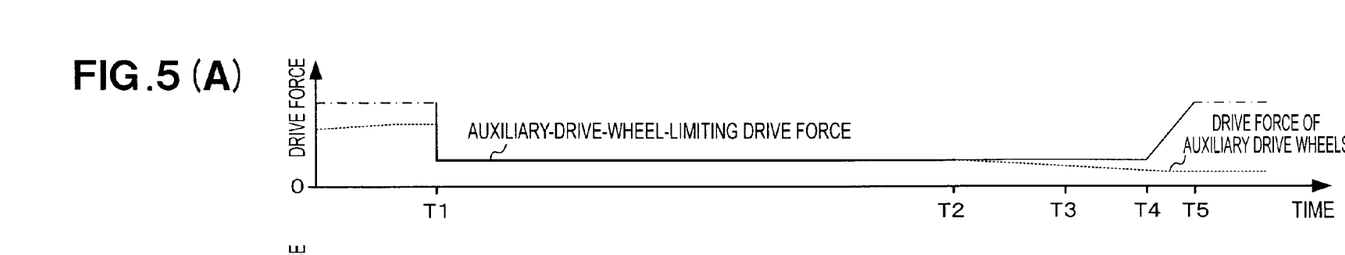
FIGS. 5(A), 5(B), 5(C), and 5(D) are timing charts illustrative of an example of the operation of a calculation unit of the control device.

FIGS. 5(A), 5(B), 5(C), and 5(D) are timing charts illustrative of an example of the operation of the calculation unit 220. In the example of FIG. 5(A), the calculation unit 220 does not output a value (single-dot-dash line) that does not limit the auxiliary drive wheel drive force at time T4. The calculation unit 220 increases the auxiliary drive wheel drive force at time T4 to a value that does not limit the auxiliary drive wheel drive force in accordance with, e.g., a predetermined gradient from time T4 to time T5. The calculation unit 220 outputs from time T4 to time T5 the changing auxiliary-drive-wheel-limiting drive force (solid line) as a second value that is greater than the auxiliary-drive-wheel-limiting drive force at time T4. The calculation unit 220 outputs a value (single-dot-dash line) that does not limit the auxiliary drive wheel drive force at time T5 and thereafter. The calculation unit 220 is capable of calculating the auxiliary-drive-wheel-limiting drive force in the first mode from time T1 to time T4, as shown in FIG. 5(A). The calculation unit 220 increases the auxiliary drive wheel drive force at time T4 to a value that does not limit the auxiliary drive wheel drive force in accordance with, e.g., a predetermined gradient from time T4 to time T5 in a second mode instead of the first mode in the case that the calculation unit 220 calculates the auxiliary-drive-wheel-limiting drive force in the first mode. In the case that the calculation unit 220 calculates auxiliary-drive-wheel-limiting drive force in the first mode, the first mode may be stopped and a value that does not limit the auxiliary drive wheel drive force may be immediately outputted at time T4 (see FIG. 3(A)).

For example, the reject flag set by the judgment unit 230 can continue to represent "1" from time T4 to time T5 (see step S610 of FIG. 4), as shown in FIG. 5(C). The calculation unit 220 is capable of slowly increasing the auxiliary-drive-wheel-limiting drive force from time T4 in the case that the reject flag represents "1." The judgment unit 230 is capable of returning the reject flag to "0" (see step S620 of FIG. 4), when the calculation unit 220 outputs a value that does not limit the auxiliary drive wheel drive force at time T5. The count value (VC) can continue to increase from time T4 to T5 (see step S580 of FIG. 4), as shown in FIG. 5(D). The judgment unit 230 can reset the count value to MIN at time T5 (see step S620 of FIG. 4).

4. Modified Examples

6(A), 6(B), 6(C), and 6(D) are timing charts illustrative of another example of the operation of the calculation unit 200.

Figure 6:
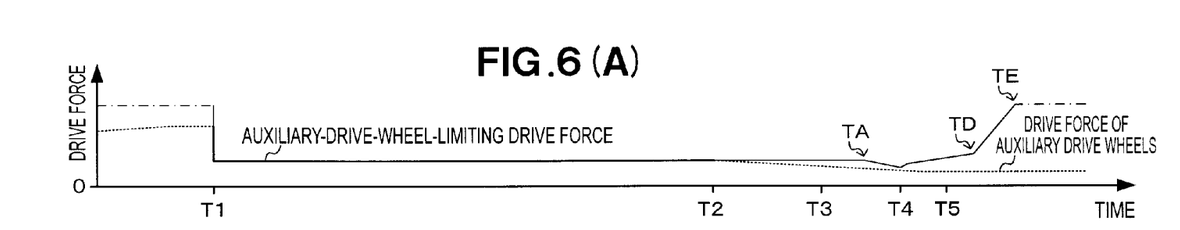
FIGS. 6(A), 6(B), 6(C), and 6(D) are timing charts illustrative of another example of the operation of the calculation unit of the control device.

The auxiliary-drive-wheel-limiting drive force decreases from time TA to time T4 and increases from time T4 to time TD, as shown in FIG. 6(A). In concert therewith, the first value β (auxiliary-drive-wheel-limiting drive force–auxiliary drive wheel drive force) calculated in the judgment unit 230 is less than the threshold value at time TB and is greater than the threshold value at time TC in the example of FIG. 6(B). Therefore, in the example of FIG. 6(D), the judgment unit 230 counts up or increments the count value from time TB to time TC (see step S540 of FIG. 4) and counts down or decrements the count value from time TC to time TD (see step S580 of FIG. 4). At time TD, the count value reaches the upper limit value UL (predetermined value) at time TD and the reject flag represents "1" (see step S610 at time FIG. 4). The calculation unit 220 thereafter increases the auxiliary drive wheel drive force to a value that does not limit the auxiliary drive wheel drive force at time TD in accordance with, e.g., a predetermined gradient from time TD to time TE (see FIG. 6(A)). In order to facilitate understanding, in the example of FIG. 6(A), the calculation unit 220 directly prepares or holds the auxiliary-drive-wheel-limiting drive force calculated at time T1 as a fixed value from time T1 to time TA, and calculates the auxiliary-drive-wheel-limiting drive force from time TA to time TD. However, the calculation unit 220 may directly prepare or hold the auxiliary-drive-wheel-limiting drive force calculated at time T1 as a fixed value from time T1 to time TD, and may continue to calculate the auxiliary-drive-wheel-limiting drive force from time T1 to time TD.

Obviously, various minor changes and modifications of the present invention are possible in light of the above teaching. It is therefore to be understood that within the scope of the appended claims the invention may be practiced otherwise than as specifically described.

What is claimed is:

1. A control device for controlling a drive force that acts on a vehicle, the control device comprising:
    a first controller that is configured to control the drive force and to output the drive force; and
    a second controller that is configured to send a limit of the drive force to the first controller, wherein
    the second controller comprises:
    an input unit that is configured to receive the drive force output by the first controller, and
    a calculation unit that is configured to compute a first limiting drive force for limiting the drive force; and
    when a first value obtained by subtracting the drive force from the first limiting drive force is equal to or greater than a threshold value, the calculation unit outputs a second value as a modified limiting drive force in place of said first limiting drive force, said second value being greater than a value of the first limiting drive force.

2. The control device according to claim 1, wherein the calculation unit continues to calculate the first limiting drive force until a count value, which is counted beginning when the first value is equal to or greater than the threshold value, reaches a predetermined value; and the calculation unit outputs the second value after the count value has reached the predetermined value.

3. The control device according to claim 1, wherein the second controller begins to send the limiting drive force to the first controller when the vehicle is traveling in an unstable state.

4. The control device according to claim 3, wherein the second controller sends the output of the calculation unit to the first controller.

5. The control device according to claim 1, wherein the calculation unit calculates the first limiting drive force in a first mode, and when the first value is equal to or greater than the threshold value, the calculation unit stops calculating the first limiting drive force in the first mode and obtains the second value.

6. The control device according to claim 1, wherein the calculation unit calculates the first limiting drive force in a first mode, and when the first value is equal to or greater than the threshold value, the calculation unit calculates the second value in a second mode.

7. The control device according to claim 1, wherein the first controller is configured to control, as the drive force, a drive force of a main drive wheel and a drive force of an auxiliary drive wheel, wherein the drive force of the main drive wheel is one of a drive force of a front wheel or a drive force of a rear wheel, and the drive force of the auxiliary drive wheel is another of the drive force of the front wheel or the drive force of the rear wheel; and
the controller is configured to send a limit of the drive force of the auxiliary drive wheel as a limit of the drive force, and the calculation unit calculates as the limiting drive force an auxiliary-drive-wheel-limiting drive force for limiting the drive force of the auxiliary drive wheel.

8. The control device according to claim 1, wherein the first controller is a drive force controller, and the second controller is a vehicle behavior controller.

* * * * *